Nov. 12, 1968  G. V. IRELAND  3,410,111
FLEXIBLE COUPLING
Filed Jan. 25, 1967
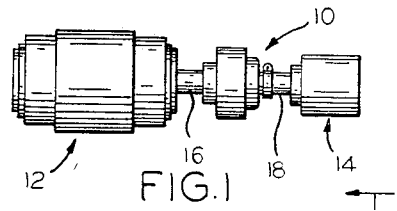
FIG.1
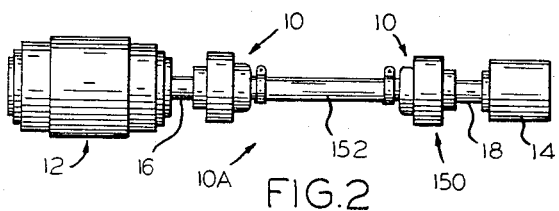
FIG.2
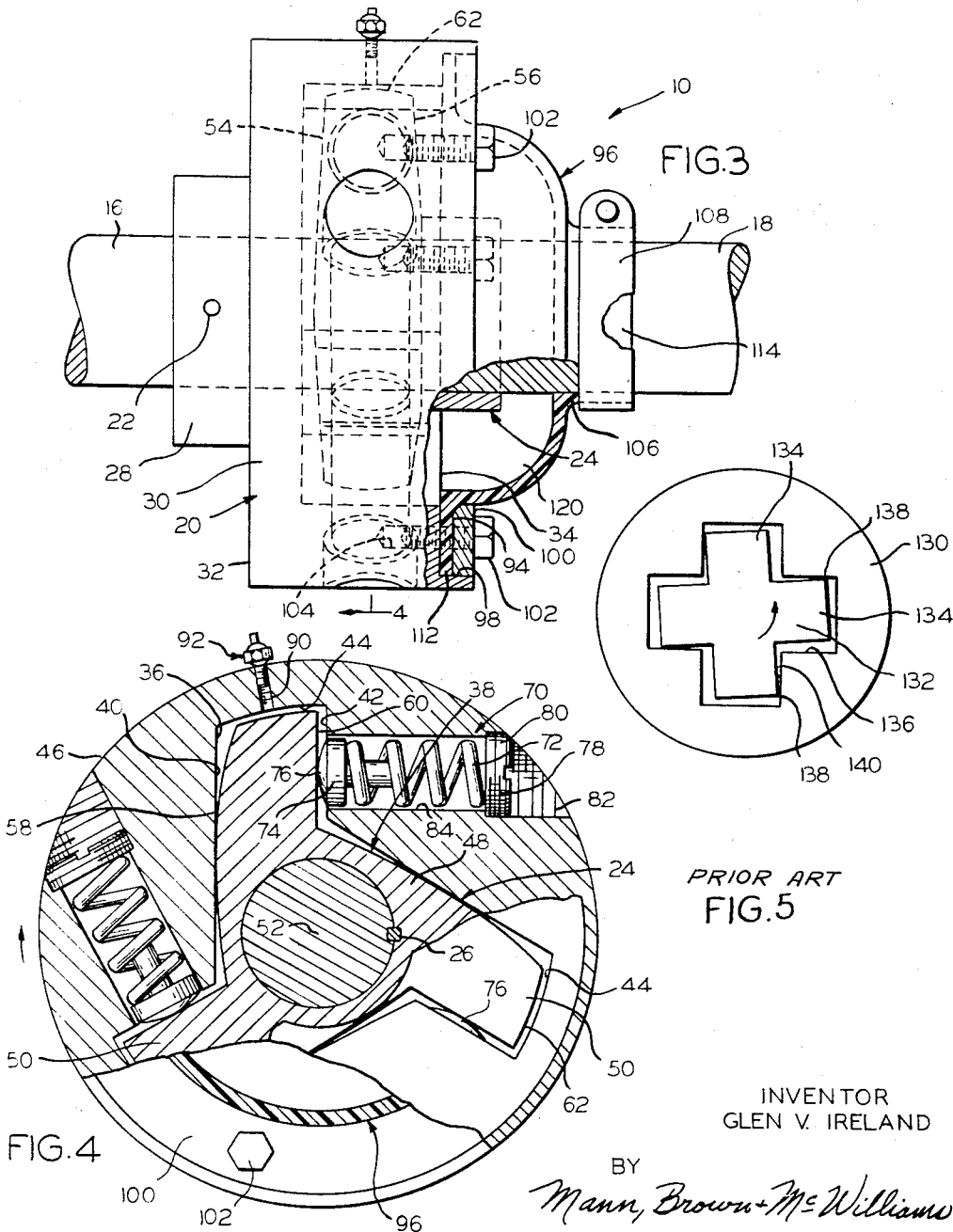
FIG.3
PRIOR ART
FIG.5
FIG.4
INVENTOR
GLEN V. IRELAND
BY
Mann, Brown & McWilliams
ATTORNEYS United States Patent Office 3,410,111
Patented Nov. 12, 1968

3,410,111
FLEXIBLE COUPLING
Glen V. Ireland, 6605 W. Bennett Ave.,
Milwaukee, Wis. 53219
Filed Jan. 25, 1967, Ser. No. 611,690
8 Claims. (Cl. 64—9)

ABSTRACT OF THE DISCLOSURE

The disclosure relates to a flexible coupling for coupling driving and driven shafts that may be out of alignment and involving a spider member adapted to be secured to one of the shafts and having outwardly extending arms that are received within recesses formed in a cooperating hub member that is adapted to be secured to the other shaft. The spider arms are each formed with a convexly shaped spherically contoured surface that provides for an engagement of substantial area with an abutment surface of the respective hub recesses, with the parts being proportioned, oriented, and biased, so that each of the arms maintains its contact with the hub member abutment surface with the respective hub member abutment surfaces at any and all positions of orientation of the spider member with respect to the hub member during the rotating movement of the shafts, even though shaft misalignment exists.

---

Prime movers, such as electric motors and internal combustion engines, are widely utilized to actuate apparatus that is rendered operative by having some element rotated. The nature of mechanical structures is such that the driving and driven components include rotating shaft elements, and a common way to transmit the drive is to couple the shafts together by simple mechanical coupling or joining devices, as distinguished from the use of gearing, or couplings of a magnetic or hydraulic type.

These mechanical coupling or joint devices contemplate that the shaft components of the driving and driven apparatus will be in substantial axial alignment, but as a practical matter, assembly tolerances actually practiced frequently result in the driving and driven shafts being out of alignment by as much as several degrees.

This is a particularly troublesome factor in the railroad field, where the driving apparatus, such as diesel engine of the modern locomotive, and the driven apparatus, such as the air compressor for supplying air to the brake system, are mounted on a common supporting car framework that tends to flex and shift due to coupler impacts and track level deviations.

While it has long been the practice to use flexible couplings in coupling the driving and driven shafts of such apparatus together, conventional flexible couplings do not operate efficiently if the shafts involved are more than a few thousandths of an inch out of alignment, and they require periodic lubrication if premature failures are to be avoided.

For instance, a common form of conventional flexible coupling used for coupling together the power take off shaft of the locomotive diesel engine with the compressor that is commonly carried on the locomotive includes a pair of flanged coupling members that are received over the respective shafts and bolted together on either side of a rubber disc separating member that is intended to flex to accommodate the shaft misalignment.

Experience has shown that the flexible disc develops fatigue in a relatively short period of time, with the result that it becomes brittle and disintegrates. Railroad operating rules have come to require that these couplings must be inspected every ninety days to catch coupling failures, and if for some reason the inspection is not made in the required time, the locomotive involved must be taken out of service until this is done.

A principal object of this invention is to provide a flexible coupling that is especially suited for use in railroad equipment in accommodating shaft misalignment caused by the operating conditions peculiar to that art.

Another important object of the invention is to provide a flexible coupling arrangement that operates just as efficiently and for as long as useful life with the shafts misaligned as when they are in substantial alignment.

Still another important object of the invention is to provide a flexible coupling device in which shaft misalignment may be accommodated without subjecting any part of the coupling to any greater stress or wear than it would be subjected to if the shafts were in substantial alignment.

Yet another important object of the invention is to provide a flexible coupling that operates quietly and insures that the area of contact between the driving and driven members thereof remains the same within the range of shaft misalignment accommodated by the coupling.

Still further objects of the invention are to provide a flexible coupling of the spider arm type in which the areas of driving contact between the driving and driven members are on the order of that provided by using a large diameter bearing ball type coupling keys, to provide a flexible coupling arrangement that provides for long term self-lubrication of its parts, thus avoiding the periodic inspection problem, and to provide a flexible coupling arrangement that is inexpensive of manufacture, that may be installed without special modifications or relocation of the apparatus that it connects, and that is adapted for a wide variety of uses.

Other objects, uses, and advantages will become obvious or by apparent from a consideration of the following detailed description and the application drawing.

In the drawing:

FIGURE 1 is a diagrammatic plan view of one embodiment of the flexible coupling device in accordance with this invention as it may be employed to connect a prime mover with an auxiliary driven apparatus, such as an air compressor;

FIGURE 2 is a view similar to that of FIGURE 1 illustrating a modified arrangement employing the principles of this invention;

FIGURE 3 is a detailed plan view of the basic coupling arrangement, with parts being broken away;

FIGURE 4 is a diagrammatic cross-sectional view substantially along line 4—4 of FIGURE 3, with parts being shown in elevation; and FIGURE 5 is a diagrammatic view illustrating a problem in related prior art couplings which is overcome by applicant's invention.

However, it should be distinctly understood that the specific drawing illustrations provided are supplied primarily for the purposes of complying with the requirements of the Patent Code and that the invention is susceptible of other specific embodiments that will be obvious to those skilled in the art.

Reference numeral 10 of FIGURES 1 and 3 generally indicates a preferred embodiment of this invention, which in FIGURE 1 is shown applied between a prime mover 12 and an auxiliary apparatus 14 for the purposes of transmitting torque to the latter. The coupling 10 in FIGURE 1 is shown connecting the driving shaft 16 of the apparatus 12 with the driven shaft 18 of the apparatus 14, and it should be understood that the apparatus generally indicated at 12 is intended to represent any prime mover, such as a diesel engine, that provides shaft 16 with an angular torque output while apparatus 14 is intended to represent any apparatus (such as an air compressor) which includes a shaft 18 that is to be rotated by connection to a shaft such as shaft 16.

Referring now to FIGURES 3 and 4, the coupling 10 generally comprises a hub member 20 keyed in any suitable manner to shaft 16, as by pin 22, and a spider member 24 (see FIGURE 4) keyed to the shaft 18 by suitable key 26.

The hub member 20 comprises a hub portion 28 and a flange portion 30 having a closed side 32 and an open side 34 formed with spaced, rectilinear, recesses or slots 36 that merge near the axial center of the hub member 20 to form the armed cavity 38.

As indicated in FIGURE 4, the recesses or slots 36 each define on either side thereof planar walls or surfaces 40 and 42 that lie in planes extending parallel to the axis of rotation of the hub member 20 and transversely thereof, and as also indicated in FIGURE 4, the walls 40 and 42 are rectilinear in configuration. The slots or recesses 36 at their outer ends define arcuate walls 44 which are concentrically related to the periphery 46 of the hub member flange portion 32.

The spider member 24 comprises a body 48 formed to define spaced arms 50 which define radially outwardly tapering end surfaces 54 and 56 (see FIGURE 3) and forward and rearward side surfaces 58 and 60 (see FIGURE 4) of special significance.

In accordance with this invention, the surfaces 58 are each spherically contoured and are struck on a radius that is at least equal to about twice the length of the respective arms 50 radially of and measured from axis 52 of the spider member. And as indicated in FIGURE 4, the surfaces 58 are convexly shaped in addition to being spherically contoured.

The surfaces 60 of the respective arms 50 are planar in configuration and lie on radii extending from the said axis 52 of the spider member.

The arms 50 at their ends define end surfaces 62 which are also spherically contoured about a radius of the same length as that employed for surfaces 58. Thus, both the surfaces 58 and 62 of each of the arms 50 are struck on a radius that is at least approximately twice the length of the respective arms 50 radially of the spider member. The radius on which surfaces 58 are struck are thus equivalent to the diameter of the imaginary sphere in which surfaces 61 lie.

As indicated in FIGURE 4, the spider member arms 50 are proportioned to fit into the armed cavity 38 of the hub member 20 so that the surfaces 58 of the arms 50 will be in lateral alignment with the walls 40 of the hub member. The parts should be proportioned and arranged so that all of the surfaces 58 will be in simultaneous contact with the respective walls 40 when the hub member 20 and the spider member 24 are in axial alignment and these members are biased relative to each other to bring them into motion transmitting relation.

The hub member 20 also includes resilient spring devices 70 each in the form of a compression spring member 72 acting between a spring seat 74 having a spherically contoured contact surface 76 for engagement with the respective spider arm surfaces 60 and a spring seat 78 in the form of an adjustment screw 80 threadedly received in the threaded portion 82 of the respective spring chambers 84 of the hub member.

The springs 70 in practice may be flat die springs of a strength appropriate to resist forces tending to separate the respective surfaces 40 and 58 due to backlash, lost motion and the like under operating conditions.

The hub member 20 is further formed with an oil receiving passage 90 communicating with one of the recesses 36 and provided with an oil receiving Alemite fitting 92 for charging the cavity 38 with a suitable lubricant such as a light oil.

The open side 34 of the hub member is closed after the spider member 24 has been inserted within cavity 38 by applying the larger end 94 of annular flexible seal 96 to a counter bore 98 of the hub member 20 over which is placed annular clamping ring member 100 which is secured in place by applying bolts 102 through same and into threaded holes 104 formed in the hub member.

The smaller end 106 of the seal member is received over the shaft 18 and clamped in seal tight relation therewith by a suitable pipe clamp 108.

The hub member and the spider member should be formed from a material such as 4140 steel that will permit these elements to be selectively heat treated in the areas of their respective surfaces 40 and 58 to a hardness of about 60 Rockwell.

The seal 96 may be formed from a suitable neoprene rubber or the like lubricant resisting material and in the form illustrated is provided with flanged end portion 112 at its larger end 94 and annular end portion 114 at its smaller end 106. The flanged end portion 112 is what is engaged by the clamping ring 100 while at the inner end 106 the annular end portion 114 is what is engaged by the pipe clamp 108.

In applying the coupling unit 10 to any particular installation situation, such as connecting prime mover 12 with the apparatus 14, the hub member 20 with the seal 96, clamping member 100 and spider member 24 separated therefrom is slipped over the end of the shaft 16 while the clamping ring 100, the seal 96 together with its associated pipe clamp 108, and the spider member 24 are applied in that order to a shaft 18. It may be pointed out that the hub member 20 and the spider member 24 are proportioned axially thereof so as to receive an adequate amount of the respective shafts 16 and 18 for reasonable torque applying purposes. Hub member 20 is keyed to shaft 16 by applying pin 22 (or any other keying means that may be employed) and spider member 24 is applied to and keyed to shaft 18 by applying key 26 or any other suitable keying means that may be employed. Members 20 and 24 are then relatively positioned so that arms 50 of the spider member may be applied to slots 36 in the orientation indicated in FIGURE 4, after which spring devices 70 may be applied in the manner also indicated in FIGURE 4 to bias the bearing surfaces 58 of the spider member arms 50 against the walls 40 of hub member slots 56.

Seal 96 may then be moved to position its end flange 112 within counterbore 98 after which clamping ring 100 is clamped into position against the seal by applying the bolts 102. The pipe clamp 108 is then tightened to clamp the end portion 114 of the seal 96 against the shaft 18 and a suitable grade of light lubricant oil is inserted into the cavity 38 and the chamber 120 defined by the seal 96 for lubrication purposes. The coupling is then ready for use.

It will be found that the device 10 can be applied to shafts equivalent to shafts 16 and 18 that are as much as five degrees or more out of alignment, and greater misalignment may be accommodated by increasing the width of hub member flange portion 32, and namely the cavity 38 to permit the inclined tilting movement of the spider member with respect to the hub member that will be involved.

The spring devices 70 initially position the bearing surfaces 58 against the respective walls 40 of the housing member 20, and in addition, these devices during operation of the device tend to hold the arms 50 in their desired positions against the walls or surfaces 40 against forces that would otherwise tend to cause a backlash or lost motion, which, together with the fixed nature of arms 50 with respect to the spider member, eliminates the severe noise problem in this art.

Furthermore, the spherical contour of the surfaces 58 insures that the arms 50 remain in simultaneous engagement with the respective walls or surfaces 40 throughout each rotation of the shafts involved as the surfaces 58 act like ball surfaces under the action of the shifting parts to maintain contact without displacement. This obtains whether shafts 16 and 18 are in or out of alignment, and as, for instance, spider member 24 is turned out of axial alignment with hub member 20 (or vice versa), up to the limit permitted by the coupling spider member 24, which merely rocks on its bearing surfaces with respect to the hub member 20. And during operation if shafts 16 and 18 are out of alignment, a similar rocking action takes place during each rotation of the coupling.

It will also be noted that the relatively large radius of generation of the respective surfaces 58 provides an area of contact with the surfaces 40 that in practice will be on the order of approximately 5/8 of an inch in diameter for couplings employing a 4½-inch radius for the surfaces 58 and 62, which is preferred for equipment employed in connection with railroad cars as, for instance, where a motor is employed to drive an air compressor, etc. This area of contact for any particular coupling size may be increased by increasing the radius of curvature of surfaces 58 in proportion to the radial length of arms 50 or at least the radius of curvature of the arc that extends axially of the surfaces 58; however, the proportioning indicated is preferred for the size coupling indicated.

Thus the coupling 10 at each arm 50 provides a greatly increased area of contact between the arms 50 and the surfaces they engage over what could be obtained by interposing balls between the spider member and the hub member that would be of a size that would fit between these members. This makes for a greatly increased efficiency of operation over ball drive couplings, which is achieved while at the same time achieving an elimination of all loose parts within the coupling thereby avoiding the noisy operation that is a characteristic of, for instance, ball drive couplings.

It will also be noted that in the arrangement illustrated an odd number of arms is employed for the spider member and the complementary recesses of the hub member, with the result that the action of the compression spring devices 70 is in opposition to all of the arms in any possible position of the coupling members with respect to each other. The odd arm numbering is thus preferred as in devices employing even numbered arms or the like there tends to be a shifting of the driving and driven coupling members with respect to each other under the action of spring devices, as the biasing action of certain of the spring devices would parallel the direction of permissible movement of certain of the arms, which would tend to cause a drop or shift in the positioning of the armed member with respect to the hub member off the desired centered position.

However, within these limitations the number of arms and recesses may be three or more in number depending on the size and loads to be carried by the coupling.

It will also be noted that the spider member 24 is proportioned so that its surfaces 62 are spaced somewhat from surfaces 44 and a spacing on the order of three thirty-seconds inch is preferred to permit the coupling to take some sidewise shifting movement.

FIGURE 5 diagrammatically illustrates a prior art coupling of the type shown in Psilander Patent 1,611,608 which is in the form of a sleeve type housing member 130 adapted to receive a spindle member 132 formed with cross arms 134 proportioned to be loosely received within recess 136 of housing member 130, which recess 136 has a configuration that complements but is somewhat larger than the cross-sectional configuration of the spindle member 132.

As indicated in FIGURE 5, when, for instance, the spindle member 132 is driven in the direction of the arrow to rotate the housing member 130 and a like spindle member located at the other end of the housing, the corners 138 or arms 134 bear against the side walls 140 of housing member 130 thus providing a line type contact between the driving member and the driven member of the coupling. This line type contact will be had only when the spindles at either side of the housing member 130 are in exact alignment and as soon as a misalignment creeps in, then the line contact will decrease to a point contact at one face of the coupling housing 130 because of the angulation of the respective spindles with respect to the axis of rotation of the housing member 130.

This is to be distinguished from applicant's device in which the same large area of contact is maintained between the driven and driving members whether or not there is misalignment within the capability of the unit.

In applicant's device, either the hub member 20 or the spider member 24 may be the driven member but the driving action transmitted between the members should be transmitted between the cooperating surfaces 40 and 58. Consequently, the direction of rotation employed to transmit drive through the coupling should be in the direction of the arrow of FIGURE 4 if the hub member 20 is the driving member, or in the reverse direction if the spider member 24 is to be the driving member.

In the embodiment 150 of FIGURE 2, the coupling unit 10A comprises a pair of devices 10 that are the same as the device 10, as indicated by corresponding reference numerals, except that the spider members of each device are applied to an intermediate shaft element 152.

In the showing of FIGURE 2, the coupling unit 10A is applied to a driving shaft 16 operated by a diesel engine 12 and a driven shaft 18 of an air compressor 14, following the teachings of this application that have already been discussed.

The embodiment of FIGURE 2 increases the shaft misalignment that can be accommodated by reason of the use of two flexible couplings 10. Also, it permits the ends of the driving and driven shafts to be spaced apart a substantial amount. In this connection, the shaft member 152 and associated couplings may be made available in varying standard lengths to accommodate specific installations.

In addition to the keying arrangements illustrated, the hub and spider members may be keyed to their respective shafts by splined connections or any other suitable keying arrangement known to the art.

The foregoing description and the drawings are given merely to explain and illustrate my invention and the invention is not to be limited thereto, except insofar as the appended claims are so limited, since those skilled in the art who have my disclosure before them will be able to make modifications and variations therein without departing from the scope of the invention.

I claim:

1. A flexible coupling for coupling together rotatable shafts, said coupling comprising:
    a spider member adapted for connection to a shaft and including spaced apart outwardly extending arms lying in a plane that extends perpendicularly of the axis of rotation of said spider member,
    a hub member having one side thereof adapted for connection to a second shaft member and the other side thereof recessed to receive said arms of said spider member,
    said arms each including on opposed sides thereof transversely extending surfaces that extend laterally of said plane,
    with one of the surfaces of each of said arms at like sides thereof including planar portions that are disposed radially of said spider member,
    and with the other of said surfaces at the other like sides of said arms being convexly contoured and being struck about radii of equal lengths,
    said hub member being formed with spaced abutment surfaces extending transversely thereof and corresponding in number to the number of said spider member convexly contoured surfaces,
    and means for resiliently biasing said spider member convexly contoured surfaces against the respective hub member abutment surfaces,
    said spider member convexly contoured surfaces and said hub member abutment surfaces being oriented so that said spider member convexly contoured surfaces simultaneously engage the respective abutment surfaces when said members are in axial alignment and are biased in a motion transmitting direction, said radii of said convexly contoured surfaces being at least approximately twice the length of said arms radially of said spider member, whereby said spider member convexly contoured surfaces maintain square contact with the respective hub member abutment surfaces in area type engagement in all positions of shaft misalignment accommodated by said coupling.

2. The coupling set forth in claim 1 wherein:

said convexly contoured surfaces of said spider member are spherical in contour.

3. The coupling set forth in claim 2 wherein:

the outwardly extending ends of said spider member arms are formed with spherically and convexly contoured surfaces struck about radii having lengths substantially equivalent to twice the length of said arms radially of said spider member.

4. The coupling set forth in claim 1 wherein:

said arms and recesses of said coupling members, respectively, are odd in number.

5. The coupling set forth in claim 1 wherein:

said biasing means comprises compression spring means for each of said arms and carried by said hub member, said spring means acting against the respective spider member planar surface portions substantially at right angles thereto.

6. The coupling set forth in claim 5 wherein:

a spring seat member is interposed between the respective compression spring means and the respective spider member arm planar surface portions, with the surfaces of said seat members engaging the respective spider member arm planar surface portions being spherically and convexly contoured.

7. A flexible coupling for coupling together rotatable shafts, said coupling comprising:

a spider member adapted for connection to a shaft and including spaced apart outwardly extending arms lying in a plane that extends perpendicularly of the axis of rotation of said spider member, a hub member adapted for connection to a second shaft member and formed to receive said arms of said spider member, said arms each including on opposed sides thereof transversely extending surfaces that extend laterally of said planes, with one of the surfaces of each of said arms at like sides thereof including planar portions that are disposed radially of said spider member, and with the other of said surfaces at the other like sides of said arms being convexly spherically contoured and being struck about radii of equal lengths, said hub member being formed with spaced planar abutment surfaces extending transversely thereof and corresponding in number to the number of said spider member convexly contoured surfaces and lying in planes paralleling the axis of rotation of said hub member, and means for resiliently biasing said spider member convexly contoured surfaces against the respective hub member abutment surfaces, said biasing means acting substantially normally of the respective arm planar surface portions, said spider member convexly contoured surfaces and said hub member abutment surfaces being oriented so that said spider member convexly contoured surfaces simultaneously engage the respective abutment surfaces, said radii of said convexly contoured surfaces being approximately twice the length of said arms radially of said spider member, whereby said spider member convexly contoured surfaces maintain square contact with the respective hub member abutment surfaces in area type engagement in all positions of shaft misalignment accommodated by said coupling, with the outwardly extending end of said spider member arms being formed with spherically and convexly contoured surfaces struck about radii having lengths substantially equivalent to twice the length of said arms radially of said spider member, and with said ends of said spider member arms being spaced from said hub member to permit a predetermined amount of shifting movement of one of said members laterally of the other of said members.

8. A flexible coupling for coupling together rotatable shafts, said coupling comprising:

a spider member adapted for connection to a shaft and including spaced apart outwardly extending arms lying in a plane that extends perpendicularly of the axis of rotation of said spider member, a hub member having one side thereof adapted for connection to a second shaft member and the other side thereof recessed to receive said arms of said spider member, said arms each including on opposed sides thereof transversely extending surfaces that extend laterally of said plane, with one of the surfaces of each of said arms at like sides thereof including planar portions that are disposed radially of said spider member, and with the other of said surfaces at the other like sides of said arms being convexly spherically contoured and being struck about radii of equal lengths, said hub member being formed with spaced planar abutment surfaces extending transversely thereof and corresponding in number to the number of said spider member convexly contoured surfaces, and means for resiliently biasing said spider member convexly contoured surfaces against the respective hub member abutment surfaces, said biasing means acting substantially normally of the respective arm planar surface portions, said spider member convexly contoured surfaces and said hub member abutment surfaces being oriented so that said spider member convexly contoured surfaces simultaneously engage the respective abutment surfaces when said arms are received in said recesses, said radii of said convexly contoured surfaces being approximately twice the length of said arms radially of said spider member, whereby said spider member convexly contoured surfaces maintain square contact with the respective hub member abutment surfaces in area type engagement in all positions of shaft misalignment accommodated by said coupling, said hub member being formed with an annular seat about said recesses, and including an annular flexible seal member having one end proportioned to engage said seat and the other end thereof proportioned to be clamped to a shaft member, and means for clamping said seal member one end in leakage free relation against said hub member seat, whereby said seal member defines a lubricant reservoir for said coupling.

References Cited

UNITED STATES PATENTS

| | | | |
|---|---|---|---|
| 1,189,609 | 7/1916 | Montgomery | 64—14 |
| 1,611,608 | 12/1926 | Psilander | 64—14 |
| 1,893,486 | 1/1933 | Black | 64—27 |

HALL C. COE, *Primary Examiner.*